United States Patent [19]

Proctor et al.

[11] Patent Number: 4,592,576
[45] Date of Patent: Jun. 3, 1986

[54] HOSE CLAMP WITH INCLINED BARBS

[75] Inventors: Robert H. Proctor, Cockeysville, Md.; Theodore R. Anjos, Shrewsbury, Pa.

[73] Assignee: Murray Corporation, Cockeysville, Md.

[21] Appl. No.: 561,062

[22] Filed: Dec. 12, 1983

[51] Int. Cl.⁴ ............................................. F16L 33/04
[52] U.S. Cl. .................................. 285/253; 285/259; 24/279; 24/283
[58] Field of Search ............... 285/252, 253, 257, 259; 24/279, 283, 274 R, 278

[56] References Cited

U.S. PATENT DOCUMENTS

| 386,882 | 7/1888 | Hecox . | |
|---|---|---|---|
| 427,709 | 5/1890 | Sherman . | |
| 1,023,639 | 4/1912 | Graham . | |
| 1,191,219 | 7/1916 | Pelter ................................ | 285/253 X |
| 1,619,841 | 3/1927 | Witwer . | |
| 1,815,145 | 7/1931 | Embree . | |
| 1,830,947 | 11/1931 | Klingel . | |
| 1,947,715 | 2/1934 | Heuer . | |
| 2,002,671 | 5/1935 | McLaughlin . | |
| 2,283,179 | 5/1942 | Buckingham . | |
| 2,314,000 | 3/1943 | Lusher et al. ................... | 285/257 X |
| 2,335,591 | 11/1943 | Hansell . | |
| 2,536,612 | 1/1951 | Murray . | |
| 3,231,955 | 2/1966 | Taylor . | |
| 3,357,432 | 12/1967 | Sparks ............................. | 285/253 X |
| 3,422,469 | 1/1969 | Tunstall et al. . | |
| 3,454,996 | 7/1969 | Tetzlaff . | |
| 4,240,184 | 12/1980 | Delhees et al. . | |

FOREIGN PATENT DOCUMENTS 373678  6/1932  United Kingdom ................ 24/279

Primary Examiner—Dave W. Arola
Attorney, Agent, or Firm—Irvin A. Lavine

[57] ABSTRACT

A wire hose clamp has barbs extending from at least one of the encircling wires forming a part of the hose clamp. The barbs extend in the direction of rotation in which the clamp is urged by the application of a tool to tighten the clamp, and may be inclined to the plane containing the axis of the wire.

20 Claims, 6 Drawing Figures

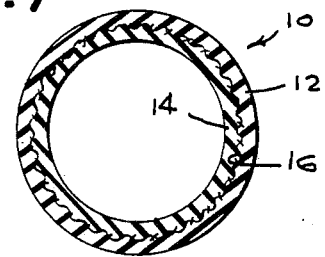
FIG. 1
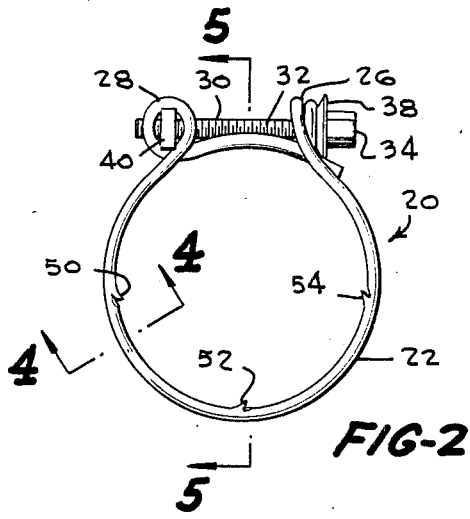
FIG-2
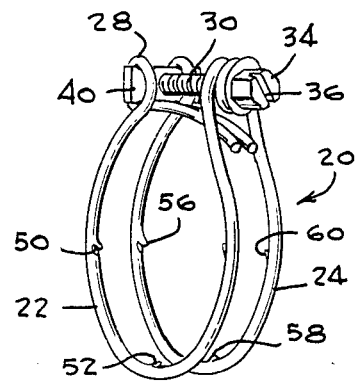
FIG-3
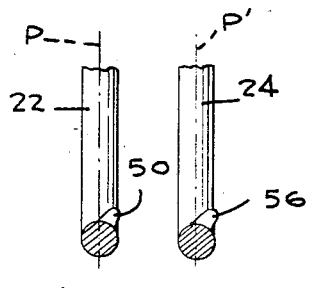
FIG-4
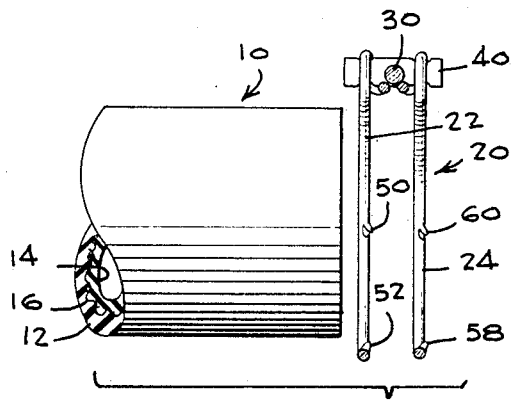
FIG-5
FIG-6

HOSE CLAMP WITH INCLINED BARBS

BACKGROUND OF THE INVENTION

The present invention relates to hose clamps for attaching elastomeric hoses to a conduit, such as a pipe.

Hose clamps are known which encircle the hose, and are contracted, as by a screw or bolt, to cause the diameter to diminish, and thereby clamp the hose onto a pipe. Those hose clamps comprise two parallel encircling wires, typically made of a single bent and formed length of wire. The hose clamp includes a nut for engagement by the screw, and the screw has a head which may be engaged by a suitable tool, such as a screwdriver or wrench, to rotate the screw and thereby tighten the clamp. Examples of hose clamps of the foregoing construction are Embree, U.S. Pat. No. 1,815,145, Heuer, U.S. Pat. No. 1,947,715, McLaughlin, U.S. Pat. No. 2,002,671 and Murray, U.S. Pat. No. 2,536,612.

Such hose clamps are applied to hoses by moving them axially over the ends of the hoses, where they are initially tightened to secure them to the hose, and subsequently further tightened in order to compress the hoses, which are of elastomeric material, and thereby clamp the hose onto the pipe in a leak-proof manner. The two steps may be done in close, substantially inseparable sequences, or the two steps may be performed as a first step of attaching the clamp to the hose, after which the hose and clamp are transported, and then the hose with the attached clamp is associated with the pipe and the hose clamp is then clamped onto the pipe in a second step.

It has been found that when the hose clamp is in position on the hose, and with the hose placed on a pipe, when the head of the screw is engaged by a tool, such as a screwdriver or a wrench, the force applied to the screw head has two components: a torque to rotate the screw, and a force along the axis of the screw, which tends to rotate the clamp on the hose, thus moving the entire clamp, including the screw head, to a different circumferential position, where it is less accessible to the tool. This situation has required either the holding of the clamp and the hose by the workman, requiring a somewhat cumbersome operation, or if the hose clamp is permitted to rotate, either the tool must be repositioned, or the clamp rotated back to its original position, to provide ready access to the head of the screw.

At the present time, and for many years passed, it has been the practice to pre-assemble the clamp onto the hose, and to provide the workman with a hose of the prescribed length for assembly to the pipes to which the hose is to be attached. A widely used technique is to attach the hose clamp, preferably of the encircling wire type hereinabove discussed, to the hose by a staple which engages the clamp and which penetrates into and through the hose. The hose being thus penetrated is subject to leaking. The problems provided by the stapling of the encircling wire hose clamp onto the hose have been known for many years. For example, Tetzlaff et al. U.S. Pat. No. 3,454,996 discloses the problems resulting from the stapled-on wire hose clamp, and provides a proposed solution which includes an additional band associated with the wire hose clamp, and having prongs extending from the band over the end of the hose, and then penetrating the hose near its end, extending from the inside of the hose radially outwardly. The construction including the band provides an anchor or locating apparatus for the wire hose clamp, but requires the expense of an extra element of the wire hose clamp, and also requires the manipulation of the prongs, to effect penetration of the hose.

There are known in the prior art a number of radially contractible hose clamps which have radially extending spurs or the like extending from the inner surface of them. For example, Hecox, U.S. Pat. No. 386,882 provides a hose clamp in the form of a metal band having spurs which extend radially, and engage or prick into the hose upon operation of a lever. Tunstall et al., U.S. Pat. No. 3,422,469 has serrations or teeth which extend radially inwardly and serve to grip and engage a metal coupling on the hose. Taylor, U.S. Pat. No. 3,231,955 provides a device in the form of a handle which is attached to a nozzle, apparently of metal, so as to rotate it and cause it to thread onto the threads of a faucet; the handle is in the form of an annular element with inwardly directed teeth to engage the nozzle, and a pair of radially extending handle parts. In these constructions, the radially extending teeth or ribs were not inclined so as to be set into anchoring position by a force on the clamp tending to rotate it, nor were they inclined so as to permit easy and ready assembly onto the end of a hose.

BRIEF SUMMARY OF INVENTION

In accordance with the invention, the encircling wire of a hose clamp is provided with one or more barbs which extend at an angle of less than ninety degrees to the inner surface of the ring, and more than tangentially to the ring, and in a direction to resist rotation of the clamp under the force applied by a tool to the head of the tightening screw of the clamp. The barb is also preferably inclined at an angle to a plane passing through the axis of the wire from which it extends, the inclination of the barbs on a first wire being somewhat towards the second wire. The second wire may also be provided with barbs, extending generally in the same inclined direction as the barbs on the first wire. Further, the barbs have a radial extent less than the thickness of the elastomeric hose with which the clamp is associated. Such elastomeric hoses are typically made of inner and outer elastomeric layers, with an intermediate fabric layer between them, and the barbs penetrate only approximately to the fabric layer, but not through the inner layer.

Among the objects of the present invention are to provide a hose clamp having barbs to resist rotation of the hose clamp due to forces created by a tool engaging the head of a screw forming a part of the hose clamp.

Another object of the present invention is to provide a hose clamp having rotation resisting barbs which do not completely penetrate the hose with which the clamp is associated.

A still further object of the present invention is the provision of a hose clamp which has barbs extending from it to resist rotation, and which barbs are inclined so as to permit ready assembly of a hose clamp with a hose.

Yet another object of the present invention is to provide a hose clamp which may be fixed in position on a hose, which will be of low cost, which will require no additional elements, and which will not require additional labor expenses in manipulation of attaching elements.

BRIEF DESCRIPTION OF THE DRAWINGS

FIG. 1 is a transverse cross-sectional view of a conventional hose.

FIG. 2 is an elevational view of a hose clamp in accordance with the present invention.

FIG. 3 is a perspective view of the hose clamp of FIG. 2.

FIG. 4 is a cross-sectional view taken on the line 4—4 of FIG. 2.

FIG. 5 is an exploded view showing the hose of FIG. 1 in elevation, and a cross-section of the clamp taken on line 5—5 of FIG. 2.

FIG. 6 is a cross-sectional view showing the clamp of FIG. 2 in position on the hose of FIG. 1.

DESCRIPTION OF THE PREFERRED EMBODIMENTS

Referring to the drawings, wherein like or corresponding reference numerals are used to designate like or corresponding parts throughout the several views, there is shown in FIG. 1 a cross-sectional view of a conventional hose 10 comprising an outer layer 12 and an inner layer 14, both of elastomeric material. A fabric intermediate layer 16 is provided, for added strength. The fabric 16 forming the intermediate layer is braided, and thereby has a configuration which is irregular, into which the layers 12 and 14 extend. In a typical hose 10, the thickness of each of the layers 12 and 14 is approximately 0.050 inches, the outer layer being compressed to a thickness of about 0.025 inches by the clamp to be hereinafer described.

In FIG. 2, there is shown an elevational view of a wire hose clamp 20 including an encircling wire or ring 22. A helix 26 is provided, having an axis parallel to a tangent of the encircling wire or ring 22, and there is also provided an external holding ring 28. A screw 30 is provided, having a threaded shank 32 and a head 34 which is flatened in known fashion so as to be engaged by a wrench. The head 34 has a slot 36, as shown in FIG. 3, whereby it may receive a screwdriver. A collar 38 may be provided on the head 34 to bear against the helix 26. The threaded shank 32 is threaded through an elongated nut 40. The nut 40 may readily be seen in FIG. 3, and FIG. 3 also shows the construction of the wire hose clamp 20 as being made from a single length of wire which is bent and formed, in known fashion, and providing a pair of spaced, parallel encircling wires or rings 22 and 24.

As shown in FIG. 2, a plurality of barbs 50, 52 and 54 extend from the encircling wire or ring 22, and FIG. 3 shows barbs 56, 58 and 60 extending from the encircling wire or ring 24. The number of barbs 50-60 and their location are not deemed to be critical. These barbs are gouged from the metal which forms the encircling wires or rings 22 and 24, in known manner. The barbs will be seen to extend from the body of the wire or ring 22, 24 in a direction which is between being tangential to the inner surface of the ring 22 or 24 and a direction which is radial thereto. Further, the barbs 50-60 extend in the direction of rotation which will be imparted to the clamp 20 by engagement of a tool such as a wrench or screwdriver with the head 34, which will tend to rotate the clamp 20 when placed on a hose 10 in the counter-clockwise direction as shown in FIGS. 2 and 3.

In FIG. 4, there is shown a portion of the encircling wire or ring 22 and the parallel encircling wire or ring 24, together with the barbs 50 and 56, extending from the rings 22 and 24, respectively. There is indicated by the line P the plane passing transversely of the axis of ring 22 and by the line P' the plane passing transversely of the axis of ring 24. The barb 50 is shown extending at an angle to the plane P, and is inclined towards the encircling wire or ring 24. The barb 56 is similarly inclined, and is generally parallel to the barb 50. As will be understood, the barbs 52 and 54 are also inclined in the same direction, relative to plane P, as barb 50.

The assembly of a clamp 20 to a hose 10 is effected by sliding the clamp 20 axially over the end of the hose 10. There may be seen in FIG. 5 the outer layer 12, inner layer 14 and intermediate fabric layer 16 forming the hose 10, and there may also be seen the shaft 32, and nut 40 forming the hose clamp 20, as well as the two parallel encircling wires 20 and 24. Wire 20 has barbs 50 and 52 extending from it in the manner hereinabove described, and the wire 24 has barbs 58 and 60, extending in the same manner. The barbs 50 and 52 on wire 22 and the barbs 58 and 60 on wire 24, being inclined to the planes P and P', enable the clamp 20 to be slipped on the hose 10 in a ready and facile manner, without significant obstruction. The clamp 10 is placed on the hose 20 at a suitable location. It will, preferably, have been provided with an internal diameter such that the tips of the barbs lightly engage the outer surface of outer layer 12 of hose 10.

A suitable tool is then applied to the head 34 of screw 30, not only to apply a torque to the screw 30, but the application of the tool will inherently provide a force tending to rotate the clamp 20 in a counter-clockwise manner, as shown by the arrow in FIG. 6. This will cause the barbs 50, 52 and 54 of the encircling wire or ring 22 to penetrate into the outer layer 12, and thereby oppose further rotation of the clamp 20 relative to the hose 10. The penetration of the barbs will anchor the clamp 20 against further rotation, permitting the head 34 to remain at an accessible location to a tightening tool. This initial tightening of the clamp 20 will serve to contract it, so that the inner surface of the wires 22 and 24 will be in engagement with the outer surface of the outer layer 12 of hose 10. In this condition, the hose 10 will have the clamp 20 assembled to it, at a desired, prescribed location relative to the end, the anchoring of the hose clamp 20 to the hose 10 effecting an assembly of these two parts for subsequent shipment and handling.

The second step in the installation of the hose onto a pipe (not shown) occurs when the hose 10 is placed over the pipe to which it is to be joined, with the clamp 20 in place, and the clamp 20 is then further contracted by the application of the tool to the head 34, to rotate the screw 30, thereby clamping the hose 10 onto the pipe. During all stages of assembly and installation, the barbs 50-60 extend through less than the entire thickness of the hose 10, the barbs 50-60 penetrating preferably the outer layer and having their tips extending substantially to the intermediate fabric layer 16.

The herein disclosed hose clamp 20 provides an attachment or anchoring means which is readily fabricated, requiring no extra or supplemental parts, and which parts are provided so as to be automatically set in penetrating engagement with the hose to which it is attached upon the application of a tool to cause contraction of the hose clamp. Further, the hose attachment elements are in the form of anchoring barbs which penetrate less than the entire thickness of the hose, thereby avoiding any possibility of a leakage path through the hose due to the attachment means or elements. The anchoring, hose penetrating barbs extend at an angle which is between radial and tangential, relative to the ring from which they extend, and their length is such that because of their angle, a good and satisfactory anchoring force and easy penetration are obtained, without penetrating further than approximately the intermediate fabric layer of the hose. In addition, the barbs are inclined to the plane passing through the axis of the encircling wire or ring from which they extend, so as to permit ready assembly over the end of a hose.

It will be obvious to one skilled in the art that various changes may be made without departure from the spirit of the invention, and therefore the invention is not limited to that shown in the drawings, and described in the specification but only as indicated in the appended claims.

We claim:
1. A wire hose clamp comprising:
 (a) encircling wire means for clamping a compressible hose,
 (b) means for causing said encircling wire means to be contracted including a tangentially extending operating element having a tool engaging head, said clamp being urged to rotate on the hose when force is applied to said tool engaging head by a tool to tighten said clamp, and
 (c) hose penetrating means for penetrating a hose to which said clamp is applied extending from said wire clamping means in a direction between tangential thereto and radially thereof and in the direction of rotation of said clamp when urged by a tool applied to said tool engaging head, whereby said penetrating means penetrates into said hose upon rotation of the clamp when urged by a tool engaging said head.

2. The wire hose clamp of claim 1, said hose penetrating means comprising at least one barb extending from a said encircling wire means.

3. The wire hose clamp of claim 1, said hose penetrating means comprising a plurality of barbs extending from a said encircling wire means at peripherally spaced locations.

4. The wire clamp of claim 1, said encircling wire means comprising a first wire and a second wire, said hose penetrating means being on at least one said wire.

5. The wire hose clamp of claim 4, said hose penetrating means being on two said wires.

6. The wire hose clamp of claim 1, said hose penetrating means being inclined to a plane passing transversely of the axis of an encircling wire means.

7. The wire hose clamp of claim 6, said encircling wire means comprising a first wire and a second wire, said hose penetrating means being at least on said first wire and being inclined towards said second wire.

8. The wire hose clamp of claim 1, said encircling wire means comprising a first wire and a second wire, said first wire having hose penetrating means thereon inclined to a plane passing through the axis of said first wire, and towards said second wire.

9. The wire hose clamp of claim 8, said second wire having hose penetrating means thereon.

10. The wire hose clamp of claim 9, hose penetrating means on said second wire being inclined to a plane passing transversely of the axis of said second wire and away from said first wire.

11. The wire hose clamp of claim 1, and in combination therewith a hose, said hose penetrating means extending through less than the entire thickness of said hose.

12. The combination of claim 11, said hose comprising inner and outer layers of elastomeric material, said hose penetrating means comprising barbs extending into said outer layer only.

13. The combination of claim 13, said hose further comprising an intermediate fabric layer between said inner and outer elastomeric layers, said barbs extending substantially to said fabric layer.

14. A wire hose clamp comprising:
 (a) first and second encircling clamping wires,
 (b) screw threaded means engaging said wires for contracting said wires upon rotation thereof, said screw threaded means including a tool engaging head for effecting rotation thereof, and
 (c) barbs extending from at least one of said wires at an angle between tangential and radial with respect to said wire and inclined in the direction of rotational movement of said hose clamp due to a force applied to said tool engaging head.

15. The wire hose clamp of claim 14, said barbs extending at an angle to the plane passing transversely of the axis of said first wire towards said second wire.

16. The wire hose clamp of claim 15, said barbs having a height from the inner part of said encircling wire less than the thickness of a hose when said wire is assembled on said hose.

17. The wire hose clamp of claim 14, said barbs having a height from the inner part of said encircling wire less than the thickness of a hose when said wire is assembled on said hose.

18. A hose claimp comprising:
 (a) encircling, contractable clamping means for extending about and clamping a hose,
 (b) means for contracting said clamping means comprising a tangentially-extending operating element having a tool-engaging head, and
 (c) hose penetrating means for penetrating a hose to which said clamp is applied extending from said clamping means in a direction between tangential and radial and in the direction of rotation of said clamp when urged by a tool applied to said tool engaging head for moving said operating element to contract said clamping means.

19. The hose clamp of claim 18, said hose penetrating means comprising at least one barb extending from said clamping means.

20. The hose clamp of claim 19, said barb extending through less than the entire thickness of the hose, and being inclined to a plane extending through the clamping means and perpendicularly to the axis thereof.

* * * * *